United States Patent [19]

Ady et al.

[11] 4,355,577
[45] Oct. 26, 1982

[54] MODEL ROCKET PROPULSION SYSTEM

[76] Inventors: Michael S. Ady, 506 - 11011 - 86 Ave., Edmonton, Alberta, Canada, T6G 0X1; Roger F. Lufkin, 504 - 9809 - 110 St., Edmonton, Alberta, Canada, T5K 1J1; Kevin L. Lynch, 12015 - 133 Ave., Edmonton, Alberta, Canada, T5E 1E8

[21] Appl. No.: 180,917

[22] Filed: Aug. 25, 1980

[30] Foreign Application Priority Data

Aug. 24, 1979 [CA] Canada .................................. 334399

[51] Int. Cl.³ ............................................. F42B 15/10
[52] U.S. Cl. .................................. 102/378; 102/287; 102/291; 102/380; 149/21; 149/41; 149/83
[58] Field of Search ............... 149/19.6; 102/288, 289, 102/374, 287, 291, 378, 380; 149/70, 76, 83, 85, 21, 41, 85, 19.6

[56] References Cited

U.S. PATENT DOCUMENTS

| | | | |
|---|---|---|---|
| 1,404,653 | 10/1920 | Ross | 149/70 X |
| 1,820,000 | 8/1931 | Luis | 149/70 |
| 3,224,191 | 12/1965 | Bratton | 102/288 X |
| 3,574,011 | 4/1971 | Knight, Jr. | 149/42 X |
| 3,664,133 | 5/1972 | Iwanciow et al. | 102/289 X |
| 3,677,010 | 7/1972 | Fink et al. | 102/288 X |
| 3,677,840 | 7/1972 | Shaw et al. | 149/83 X |
| 3,912,562 | 10/1975 | Garner | 149/76 X |
| 3,986,908 | 10/1976 | Grebert et al. | 149/83 X |

Primary Examiner—Peter A. Nelson
Attorney, Agent, or Firm—G. H. Dunsmuir

[57] ABSTRACT

The invention relates generally to a small model rocket motor. The motor includes a plastic composite propellant, and plastic ablative nozzle, and provides means for producing thrust, a time delay, and a charge to activate external devices of desirable design.

5 Claims, 9 Drawing Figures

MODEL ROCKET PROPULSION SYSTEM

BACKGROUND OF THE INVENTION

This invention relates generally to toy rockets, but more specifically to a means of propulsion for such rockets.

The prior art is replete with patents relating to rockets, rocket motors and ignition devices, and a number of such patents are included hereafter for reference purposes:

U.S. Pat. No. 957,210 to Hitt—1910
U.S. Pat. No. 1,567,267 to Hitt—1910
U.S. Pat. No. 1,901,852 to Stolfa—1933
U.S. Pat. No. 2,649,735 to Field—1953
U.S. Pat. No. 2,841,084 to Carlisle—1958
U.S. Pat. No. 3,010,355 to Cutforth—1961
U.S. Pat. No. 3,019,687 to Gongwer—1962
U.S. Pat. No. 3,044,399 to Easton—1962
U.S. Pat. No. 3,125,955 to Estes—1964
U.S. Pat. No. 3,322,067 to Gould—1967
U.S. Pat. No. 3,353,446 to Levesque—1967
U.S. Pat. No. 3,363,559 to Estes—1968
U.S. Pat. No. 3,422,763 to Wait—1969
U.S. Pat. No. 3,521,564 to Gould—1970
U.S. Pat. No. 3,570,405 to Heady—1971
U.S. Pat. No. 3,741,120 to McAllister—1973
U.S. Pat. No. 3,910,188 to Stevens—1975

Notwithstanding the above prior disclosures, it has been found that a need still exists for a rocket motor that can be both manufactured and used with safety.

SUMMARY OF THE INVENTION

Accordingly, the present invention provides a novel pyrotechnic composition which is capable of acting as a propellant for a toy rocket, and one which is capable of burning stably and efficiently in a central port burning configuration within the context of a small motor casing.

In one aspect of the invention, a novel rocket motor is provided comprising an elongate, open-ended tubular casing; a propulsion nozzle located within the casing adjacent the lower end thereof, the nozzle being provided with a passageway formed longitudinally therethrough, the passageway, at one end, being provided with a restricted throat section; a solid elongate propellant grain located within the casing intermediate the length thereof, the grain having a substantially cylindrical elongate burning port extending partway therethrough, the port having a diameter substantially greater than the diameter of the nozzle throat section, the grain being further located within the casing adjacent the nozzle means such that the post is indexed with the passageway; and ejection charge means located within the casing in intimate contact with the top end surface of said propellant grain.

In yet a further aspect of the invention pytotechnic compositions for use as a propellant for a toy rocket are provided comprising the following ingredients in the following percentages by weight ranges:

| 1. Potassium Nitrate (fine granular) | 65–70 |
|---|---|
| Corn Starch Filler (powder) | 12–18 |
| Furan Resin Binder (liquid) | 15–25 |
| Catalyst | 1–5 |
| 2. Potassium Perchlorate (fine granular) | 40–50 |
| Potassium Nitrate (fine granular) | 20–30 |
| Corn Starch Filler (fine powder) | 10–20 |
| Furan Resin Binder (liquid) | 15–25 |
| Catalyst | 1–5 |
| 3. Ammonium Perchlorate (powder) | 5–20 |
| Potassium Perchlorate (fine granular) | 30–40 |
| Potassium Nitrate (fine granular) | 20–30 |
| Corn Starch Filler (fine powder) | 0–10 |
| Furan Resin Binder (liquid) | 15–25 |
| Catalyst | 1–5 |

Finally, a novel nozzle composition is provided for use in the motor, according to the present invention, which composition comprises the following ingredients in the following percentage by weight ranges:

| Furan Resin Binder (liquid) | 40–99 |
|---|---|
| Corn Starch Filler (fine powder) | 0–60 |
| Catalyst | 1–5 |

BRIEF DESCRIPTION OF THE DRAWINGS

The invention will now be described, by way of example only, reference being had to the accompanying drawings in which.

DESCRIPTION OF THE PREFERRED EMBODIMENT(S)

Figure 1:
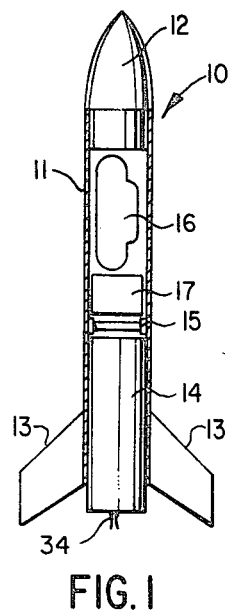
FIG. 1 is a longitudinal, vertical sectional view of a typical model rocket, illustrating the basic construction and location of the major components.

Referring now to the appended drawings, a typical model rocket can be seen from FIG. 1. Rocket 10 is preferably constructed of lightweight materials such as plastics, cardboard and balsa. The body tube 11 is, in this embodiment, a thin walled cardboard tube which serves to support or enclose all other internal components of the model rocket. The nose cone 12 may be formed of balsa wood, or plastic; and of such shape as to effect a reduction in aerodynamic drag. The nose cone 12 is releasably attached to the body tube 11, to facilitate removal therefrom. Stabilizing fins 13, positioned adjacent the rear end of rocket 10, are formed from balsa wood, plastic or cardboard, and are of a size and planform chosen to maintain the centre of pressure substantially aft of the centre of gravity. Rocket motor 14 is an expendible and replaceable solid propellant device, insertable into the rear end of the rocket 10 (tube 11), to abut hollow bulk head 15. The recovery device 16, typically a plastic-film parachute, or alternatively, a crepe-paper streamer is inserted within body tube 11 within the spaces between the hollow bulk head 15 and nose cone 12, protected from the heat generated by the motor by way of a loosely packed flame-proof wad 17.

Figure 2:
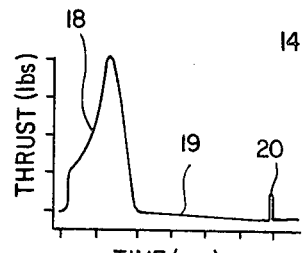
FIG. 2 is an example of a time-thrust graph obtained from a motor constructed according to the present invention, wherein the ordinate represents thrust, and the abscissa represent time.
Figure 3:
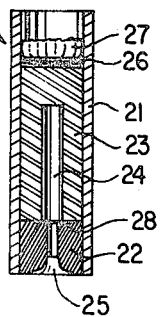
FIG. 3 is a longitudinal, vertical sectional view of a motor constructed according to the present invention.

The model rocket motor 14, according to the present invention, and to be described in more detail hereafter, performs a sequence of functions, as illustrated by the time thrust graph of FIG. 2. Referring specifically to FIGS. 2 and 3, and upon ignition, the motor expends a major portion of its propellant grain 23 producing thrust 18 to accellerate the rocket into the air. The period of significant thrust typically lasts for less than 2 seconds. After thrust, there is a timed period of negligable thrust known as the time delay 19, the duration of which typically is less than 10 seconds. This time delay 19 allows the model rocket to expend its post-thrusting momentum to thus reach appogee. Upon exhaustion of the time delay period 19, a charge or quantity of fast burning gas generating pyrotechnic is ignited; this charge is known as the ejection charge 26 and appears as a small spike 20 in the time thrust graph, blowing upwardly through the body tube 11, to forcing the wadding 17; recovery device 16; and nose cone 12 out of the body tube 11. This sequence of events effects to deploy the recovery device 16. It is also possible to utilize the ejection charge 26 to activate other devices of desirable design.

Figures 7, 8:
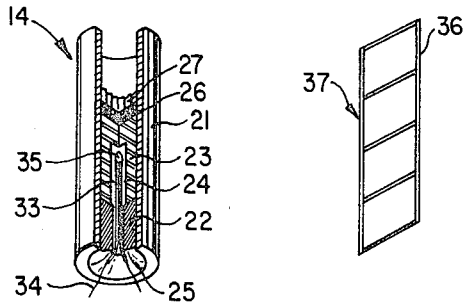
FIG. 7 is a longitudinal, part-sectional perspective view of the motor according to FIG. 3, with an igniter installed.
FIG. 8 is a side perspective view of a jig suitable for the production of a number of igniters.

Looking now to FIGS. 3 and 8 which disclose a motor constructed according to the present invention, the device depicted has the form of an elongate cylinder, which may be formed with a treated parallel wound kraft paper tube; rigid head and flame resistant plastic tube; or indeed, a combination thereof, as its casing 21.

The propellant grain 23 is molded within the casing 21, with the propellant grain 23 to the casing 21. The propellant grain 23 is formed with an elongate burning port 24. The propellant grain 23 is so formed to extend above the end of the port 24 a sufficient distance to allow the propellant to burn until the burning surface area is reduced to essentially the cross-section area along the inner diameter of the casing 21, at which point, the motor thrust is negligible. The propellant grain 23 is so formed to further extend past said distance, a distance necessary to effect a time delay 19 (FIG. 2) of any desired duration. This arrangement differs from the prior art in that with the type of propellant grain utilized in the motor of the within invention, no separate delay charge is required.

The ablative material comprising the novel nozzle 22 is molded within the casing 21, with the ablative material itself acting as an adhesive to bond the nozzle 22 to the casing 21. The nozzle orifice 25, being formed with both a throat section and an expansion section.

The ejection charge 26 is comprised of a minute quantity of any fast burning, gas generating pyrotechnic, and is placed in the motor 14 adjacent the top surface of the propellant grain 23, and held in place with a retainer cap 27.

Conventional model rocket motors utilize black blasting powder as the major propellant constituent. It is for this reason that the prior art manufacturing techniques require that the model rocket motor manufacturing plant be located on large, empty tracts of land, and for safety, operated using only pneumatic and hydraulic equipment and controlled remotely as a further safety factor.

The motor, according to the present invention, employs a pyrotechnic composition as a propellant, which shows little or no susceptibility prior to hardening to ignition by sparks, impact, or friction, and is not significantly susceptible to ignition by impact or friction after hardening. The burn rate of this novel, hardened pyrotechnic composition is less than 2.5 mm/s (0.1"/sec), so it will not burn explosively in unconfined spaces at room temperature, meaning that the propellant is typically less dangerous to handle than most hydrocarbon solvents. These properties of the propellant make it safe to manually work, and additionally, enables the techniques of fibre reinforced plastics manufacture readily adaptable to the manufacture of model rocket motors.

The propellant, according to the present invention, is typically mixed in two steps. The first step involves the preparation of a premix, which contains all of the ingredients, save the catalyst/hardener. The premix is relatively stable, and will not harden for periods in excess of 30 days, without the addition of the catalyst. The second step is the preparation of the final mix, which includes the premix, and a sufficient amount of catalyst to provide a useful pot life in excess of 5 minutes, and not exceeding 1 hour.

In accordance with the invention, the basic composition of the premix involves the following ingredients substantially in the given percentage by weight proportions:

| | |
|---|---|
| Potassium Nitrate (fine granular) | 60–85% |
| Corn Starch Filler (powder) | 0–24% |
| Furan Resin Binder (liquid) | 15–25% |

The quantities of these components of the premix are marginally adjusted to provide a desirable burn rate which is typically between 1.2 mm/s and 1.8 mm/s (0.05"/s and 0.07"/s) and to provide a consistency much like soft play dough. This consistency being chosen to facilitate extrusion, and forming of the catalyzed propellant.

The type of catalyst used as a hardener in the final mix is chosen from the many available commercially to harden Furan resin. The choice will depend typically only on the curing temperature, and the curing period. Catalysts are available which make it possible to cure the propellant at room temperature in less than a day.

Another advantage of this novel pyrotechnic composition is its burn stability in the port burning configuration in a casing of inside diameter greater than 66 mm (0.25") and less than 18 mm (0.7"). The burn stability of this composition is one part due to the low response to pressure of the burn rate of the potassium nitrate oxidizer, and on the other part, due to the charring nature of the Furan resin binder, and corn starch filler. Both the binder and the filler tend to burn in a two step sequence. Upon initial heating, both expel large amounts of gases, primarily hydrogen and its oxides. This initial pyrolization leaves behind a glassy carbonaceous matrix, known as char, which will also burn in a high temperature, oxygen rich atmosphere, but at a very slow rate. The charring effect of the filler/binder protects the oxidizer, which is molten just below the burning surface from excessive erosion due to transient pressure shocks, and other erosive effects. Therefore, while motors of the size described, with an elongate central port utilizing composite plastic propellants, are normally subject to very severe resonance burn stability problems, the above two stabilizing mechanisms protect a motor constructed by the art of this invention from both chuffing and explosions.

The propellant composition of the present invention may, however, be altered, through the addition of other oxidizers, for the purpose of either increasing the specific impulse, or increasing the burn rate of the propellant.

For example, potassium perchlorate may be included in the basic premix to produce a composition with the given percentage by weight limits:

| | |
|---|---|
| Potassium Perchlorate (fine granular) | 25-50% |
| Potassium Nitrate (fine granular) | 20-59% |
| Corn Starch Filler (fine powder) | 0-20% |
| Furan Resin Binder (liquid) | 15-25% |

This composition exhibits typically 75% greater specific impulse than the basic composition, when tested in the same motor configurations. The amount of potassium perchlorate which may be added to the composition is limited in its extremum by the corresponding decrease in burn stability, due to the relative decrease in the presence of the potassium nitrate. Compositions including amounts of potassium perchlorate in excess of 50% tend to be highly pressure sensitive, making it difficult to construct a motor which will burn the propellant efficiently, but will not overpressure and explode.

Furthermore, ammonium perchlorate may be added in addition to potassium perchlorate to the basic premix in order to increase the burn rate:

| | |
|---|---|
| Ammonium Perchlorate (powder) | 5-20 weight percent |
| Potassium perchlorate (fine granular) | 20-40 weight percent |
| Potassium Nitrate (fine granular) | 20-59 weight percent |
| Corn Starch Filler (fine powder) | 0-10 weight percent |
| Furan Resin Binder (liquid) | 15-25 weight percent |

With this composition, burn rates of 2.3 mm/s to 2.5 mm/s (0.09"/s to 0.1"/s) are typical.

Ammonium perchlorate is even more pressure sensitive than potassium perchlorate, and so it must be limited to very small quantities within the composition, in order to maintain burn stability.

The configuration of the motor, according to the present invention, is unique as compared to other small model rocket motors, in that the port 24 is of a larger diameter than the nozzle throat. In the simplest mode of manufacture, it is necessary to install the nozzle 22 in the casing 21 after the propellant, in the reverse of the sequence normally employed in the manufacture of small model rocket motors.

In larger prior art motors, a nozzle composed of some refractory material such as porcelain, or a solid piece of graphite is generally glued into position. This method is not entirely satisfactory within the context of a small motor, since the casing is highly susceptible to the erosive effects of the exhaust gases and, therefore, the nozzle must be effectively bonded to the bottom surface of the propellant grain. The motor of this invention utilizes, as a nozzle material, a novel ablative material which is essentially the filler/binder of the propellant.

The percentage of weight limits of composition of the filler/binder are:

| | |
|---|---|
| Furan Resin Binder (liquid) | 40-99% |
| Corn Starch Filler (fine powder) | 0-60% |
| Catalyst/Hardener | 1-5% |

This mixture functions as an organic ablative for the same reason that it stabilizes the burning of the propellant. Without the presence of an oxidizer in the material to disrupt the structure of the material, and to interfere with its natural ablative properties, the material produces a tough layer of char on its surface upon pyrolization. The char is deterrent to further pyrolization, and is dimensionally stable under the erosive effects of a highly oxidizing flame at sonic velocities; therefore, the ablative is an efficient nozzle orifice material.

Prior to hardening the ablative mixture is a viscous liquid, which may be poured into the nozzle cavity, in the motor, and upon hardening will bond itself very tightly to the bottom surface of the propellant grain, and to the casing.

The chemistries of the propellant and ablative are not totally restricted to the use of furan resin as a binder. The use of phenolic and phenolic type resins, such as phenolformaldehyde, pheno-furfuraldehyde, urea-formaldehyde, and melamine-formaldehyde, and both the thermosetting and thermoplastic varieties are also possible. The main criteria for selecting a suitable binder is that it functions as an efficient ablative material in a semi-pure state, or when mixed with an inert, or charring filler. The properties of an efficient ablative are the same properties which allow the propellant to burn stabily within the context of the invention. The only other requirement of the resin is that it also functions as an efficient adhesive, to the purpose of bonding the propellant and ablative to the motor casing.

The corn starch filler may also be substituted for in both the ablative nozzle and propellant, but most other fillers tend to slightly degrade the processability and ablative properties of the resin/filler system. They are essentially two classes of fillers which function as required. The first class is the charring or precharred fillers, which function in much the same way as the corn starch filler. The second class of fillers is the inert fillers, which function only as thrixotophes and volumetric extenders to the compositions. A list of a limited number of the possible filler substitutes is included below:

FILLER SUBSTITUTES

Class 1 Precharred, or charring fillers

Wood Flour (finely powdered hardwood)
Charcoal (fine powder)

Class 2 Inert Fillers $BaO_2$ (finely powdered)
$SiO_2$ (finely powdered)
$TiO_2$ (finely powdered)

A preferred method of manufacturing a rocket motor, according to the present invention, will now be described.

As indicated previously, the invention is especially disposed to manufacture by the methods and techniques of the reinforced plastics industry, and other capitol non-expensive techniques.

The propellant premix may be mixed in conveniently sized batches, from 5 to 50 kg., with a commercial dough mixer.

Prior to insertion into motor casings, the final mix may be mixed in a smaller mixer, or it may be mixed within the equipment used to insert the propellant into the motor casings.

The propellant is placed in the motor casings 21 with extruding equipment. The extruding equipment may be of a form incorporating an auger, or a piston, or both. The relative insensitivity of the propellant to friction and impact does not hamper the choice of extrusion equipment.

The propellant charge 23 is simultaneously measured by volume, as it is extruded into the motor casing 21. The charge 23 is then formed with special forming tools inserted into both ends of the casing 21.

The forming process both shapes the port 24 and positions the propellant grain 23 properly within the casing 21.

The propellant is allowed to harden, and a small disk of pressure sensitive (adhesive) paper, i.e., the port cap 28, is applied to the bottom surface of the propellant port 24. The motor is held in an upside-down attitude and the catalyzed ablative material is poured in to fill the void above the port cap, and to form a solid plug which will be shaped into a nozzle 22. The nozzle orifice 25 is formed in the ablative material either by the application of a surface mold while the ablative material is soft, or by machining after the material has hardened. Should a surface mold be used in the formation of the nozzle orifice 25, it shall be necessary to provide an orifice through the port cap 28 after the ablative material has hardened, and the mold has been removed; alternatively, in the case of a disposable mold, which is left bonded to the nozzle, an orifice must be provided through both the port cap 28 and that part of the mold adjacent to the port cap 28.

The motor is restored to its upright attitude upon the hardening and forming of the ablative material. A small quantity of a fast burning, gas generating pyrotechnic, such as smokeless powder or black powder, is poured into the top end of the motor casing 21 to lie against the top surface of the propellant grain 23 to act as the ejection charge 26. In the case of black powder, a charge of 0.1 g (0.0035 oz.) is sufficient to activate the usual recovery devices. The black powder, or smokeless powder, is handled by the usual techniques of shell, and cartridge loading. The small quantities of powder required, make the procedure relatively safe.

A small paper disk is crimped into place above the ejection charge to act as a retainer cap 27, or some other suitable material may be poured into the top of the motor and pressed into place to the same function.

Composite propellant rocket motors, with an elongate central port, must be ignited from the top end of the port 24 to assure proper and complete ignition. Should such a motor be ignited from the rear end of the port 24, there is a possibility that the motor would burn in an essentially "end burning" configuration. This possibility would lead to the inefficient burning of the propellant, resulting in very little thrust being developed.

Igniters of the prior art have been of primarily two types. The first type involves the use of a heating element external to the motor, to ignite a fuse which leads to the top end of the port. This type of igniter relies on the fuse to burn quickly, so that the top end of the port is ignited before chamber pressures can develop and expel the fuse. A second type of prior igniter relies on a heating element, installed adjacent to the top end of the propellant port. Insulated conducting leads run from the heating element, out of the nozzle, where electrical contact can be made.

The igniter, as preferred for use with the motor of this invention, is an improvement on the second type of prior art igniter described above, which has depended upon soldering or welding, to effect attachment of the insulated leads to the heating element. Thus, this prior method of production has not been suited to mass-manufacture.

Figures 4, 5:
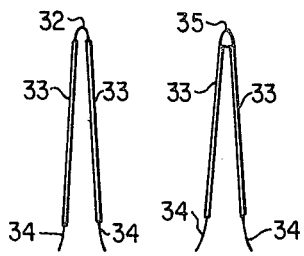
FIG. 4 is an illustration of a preferred form of igniter for use with the motor according to FIG. 3.
FIG. 5 is an illustration of an alternate embodiment of the igniter according to FIG. 4.
Figure 6:
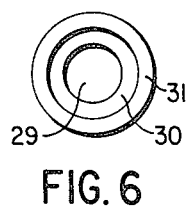
FIG. 6 is a transverse cross-sectional view of an igniter lead taken substantially upon the plane passing along section line A—A of FIG. 5.

The igniter proposed for use with the present invention (FIGS. 4, 5 and 6) makes use of a highly resistant, highly resilient wire, such as michrome or chromel, not only to form the heating element, but also as a gasis material for the leads. The leads are coated with a highly conductive metal such as copper, nickel, or tin, for the purpose of reducing electrical resistivity. This procedure eliminates the necessity of soldering, welding, or otherwise attaching the leads to the heating element. It is, therefore, possible to mass-produce igniters with very simple and inexpensive equipment.

The manufacture of such igniters, commences with selectively coating sections of a resistance wire with a highly conductive metal, such as copper, nickel, or tin. One such alloy wire, Chromel D, with a composition: 35% nickel; 18.5% chromium; 44% iron; 1.5% silicon; and diameter 0.33 mm (0.0128"), has been used as the basis material for the preferred constituents of the igniter. In this embodiment, the igniter is used with a 6 to 12 volt DC power supply, and igniter tip 32 comprises of a section of bar resistance wire approximately 5 mm (0.2") in length.

When copper, nickel, or any other similar metal is to be coated onto the basis material 29, it is most suitably deposited upon the wire by means of conventional electroplating techniques. The method of electroplating to be described hereafter, with reference to FIGS. 4–7, 8 and 9, is especially disposed to the production of igniters in batches numbering in the hundreds or indeed thousands.

The wire is wrapped many times around the width of a suitable shaped jig (FIG. 8) which is composed of a flat, essentially vacuous network of metal rods. The width of the jig is made approximately equal to the length of wire to be used in a single igniter.

The sections of the wire 29, adjacent to the outer rods 36 on the jig 37, are coated with an electrical insulating material, which is also easily removed from the wire at a later time. The purpose of this insulating material is to protect the sections of the basis wire 29 from the coating action of the electroplating bath. Rubber paper cement, or a mixture of 5% lubricating oil with 95% butrate dope, have proven effective in this application.

Once the insulating material has dried or hardened, the jig is immersed in a conventional plating bath, and a coating of the plating metal 30 is deposited on the wire to thickness sufficient to reduce the resistance of the coated sections of the wire enough that, in the configuration of the igniter, only the igniter tip 32 heats up significantly upon the application of low voltage electrical power. The jig 37 serves to conduct the electrical current used in the plating process uniformly to all of the winds of the wire.

Upon the completion of the electroplating of the igniter wire, a small section of its width, twice the length of the igniter contacts 34, in the middle of the jig;

along the entire length of the jig; and on both sides of the jig, is covered by any suitable means. The purpose of said covering is to protect the igniter contact portions 34 of the igniters from being coated by the insulating material 31, which is subsequently sprayed onto the wire to form the insulated igniter leads 33. Any electrically insulating spray paint, or sprayable resin, which is sufficiently flexible when hardened to withstand the normal flexing of the igniter leads without flaking or cracking, may be used as the insulating material. The purpose of the flat, essentially vacuous form of the jig 37, is to facilitate the passage of sprayed insulating material through to the side of the igniter leads which faces towards the jig. A sufficient quantity of insulating material is sprayed from both sides of the jig to completely coat all exposed portions of the wire.

Upon the hardening of the insulating material, all insulating materials on the igniter tips 32, i.e., on that part of the igniter wire adjacent to the outer rods 36 of the jig, are removed by mechanical abrasion, such as is possible with a wire brush. The purpose of removing said insulating materials is to facilitate the release of the igniters from the jig.

Figure 9:
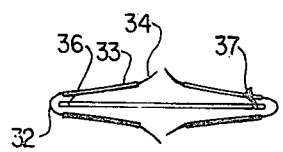
FIG. 9 is a top view of the jig according to FIG. 8, showing the relative position of igniters as they are separated from the production jig.

The final step is to cut the winds of wire in two in the middle of the width of the jig, as shown in FIG. 9, along the entire length of the jig, thus releasing the igniters.

The igniter is made long enough so that when operatively positioned within motor 14, the igniter tip 32 may touch the terminal or top end of the port 24 (FIG. 7) while the igniter contacts 34 and a short portion of the igniter leads 33 project externally out of the nozzle 22.

An optional post-final step in the method of manufacturing the igniters involves dipping the igniter tips 32 in a phrotechnic substance to obtain a small protechnic bead 35 on the tip 32, to the purpose of acting as an ignition booster. The following composition has been used with success:

| Potassium Perchlorate (fine powder) | 30–60 weight percent |
|---|---|
| Contact Cement (liquid) | 40–69 weight percent |
| Cupric Oxide (fine powder) | 1–5 weight percent |

The composition is thinned with an appropriate solvent to a dipping consistency.

The preferred form of igniters may also be produced in a continuous process (not shown) whereby the basis wire is coiled by means of a continuous coiling device into a flattened coil, which is approximately 1 mm (1/16") in thickness, and of a width equal to the length of one igniter.

The continuous coil is next coated with copper, or nickel, or any other similar metal by means of electroplating, or with tin or any other similar metal, by means of a molten metal bath. The coil is supported in the bath so that one edge of the coil does not enter into the bath, and is not coated by the bath. This edge corresponds to the igniter tip 32 portion of the wire.

After coating, the edge of the coil opposite the uncoated edge and the sections of the wire which are adjacent to the said edge for a distance equal to the length of the igniter contacts 34, are covered. A suitable insulating material, as specified above, is sprayed onto the uncovered portions of the wire.

The igniter wires are then cut apart along the edge of the coil adjoining the igniter contact 34 portions of the wire.

As described previously, the tips of the igniters 32 may be dipped in a pyrotechnic composition.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

We claim:

1. A propulsion motor for a toy rocket comprising:
   (a) an elongate, open ended tubular casing;
   (b) nozzle means formed from a plastic composition comprising the following ingredients in the following percentages by weight ranges:

| Furan Resin Binder (liquid) | 40–99 |
|---|---|
| Corn Starch Filler (fine powder) | 0–60 |
| Catalyst | 1–5; and | located within said casing adjacent the lower end thereof, said nozzle means having a passageway formed longitudinally therethrough, which passageway, at one end, is provided with a restricted throat section;
   (c) a solid propellant grain located within said casing intermediate the length thereof, said grain having a substantially cylindrical elongate burning port extending partway therethrough, said port having a diameter substantially greater than the diameter of said nozzle throat section, said grain being further located within said casing adjacent said nozzle means such that said port is indexed with said passageway, and;
   (d) ejection charge means, located within said casing in intimate contact with the top end surface of said propellant grain.

2. The motor, according to claim 1, wherein said propellant grain comprises the following ingredients in the following percentages by weight ranges:

| Potassium Nitrate (fine granular) | 60–85 |
|---|---|
| Corn Starch Filler (powder) | 0–24 |
| Furan Resin Binder (liquid) | 15–25 |
| Catalyst | 1–5 |

3. The motor, according to claim 1, wherein said propellant grain comprises the following ingredients in the following percentage by weight ranges:

| Potassium Perchlorate (fine granular) | 25–50 |
|---|---|
| Potassium Nitrate (fine granular) | 20–59 |
| Corn Starch Filler (fine powder) | 0–20 |
| Furan Resin Binder (liquid) | 15–25 |
| Catalyst | 1–5 |

4. The motor, according to claim 1, wherein said propellant grain comprises the following ingredients in the following percentages by weight ranges:

| | |
|---|---|
| Ammonium Perchlorate (powder) | 5–20 |
| Potassium Perchlorate (fine granular) | 20–40 |
| Potassium Nitrate (fine granular) | 20–59 |
| Corn Starch Filler (fine powder) | 0–10 |
| Furan Resin Binder (liquid) | 15–25 |
| Catalyst | 2–5 |

5. The motor, according to claim 1, wherein said nozzle means is formed from a plastic composition comprising the following ingredients in the following percentages by weight ranges:

| | |
|---|---|
| Furan Resin Binder (liquid) | 40–99 |
| Corn Starch Filler (fine powder) | 0–60 |
| Catalyst | 1–5 |

* * * * *